United States Patent Office 2,971,284
Patented Feb. 14, 1961

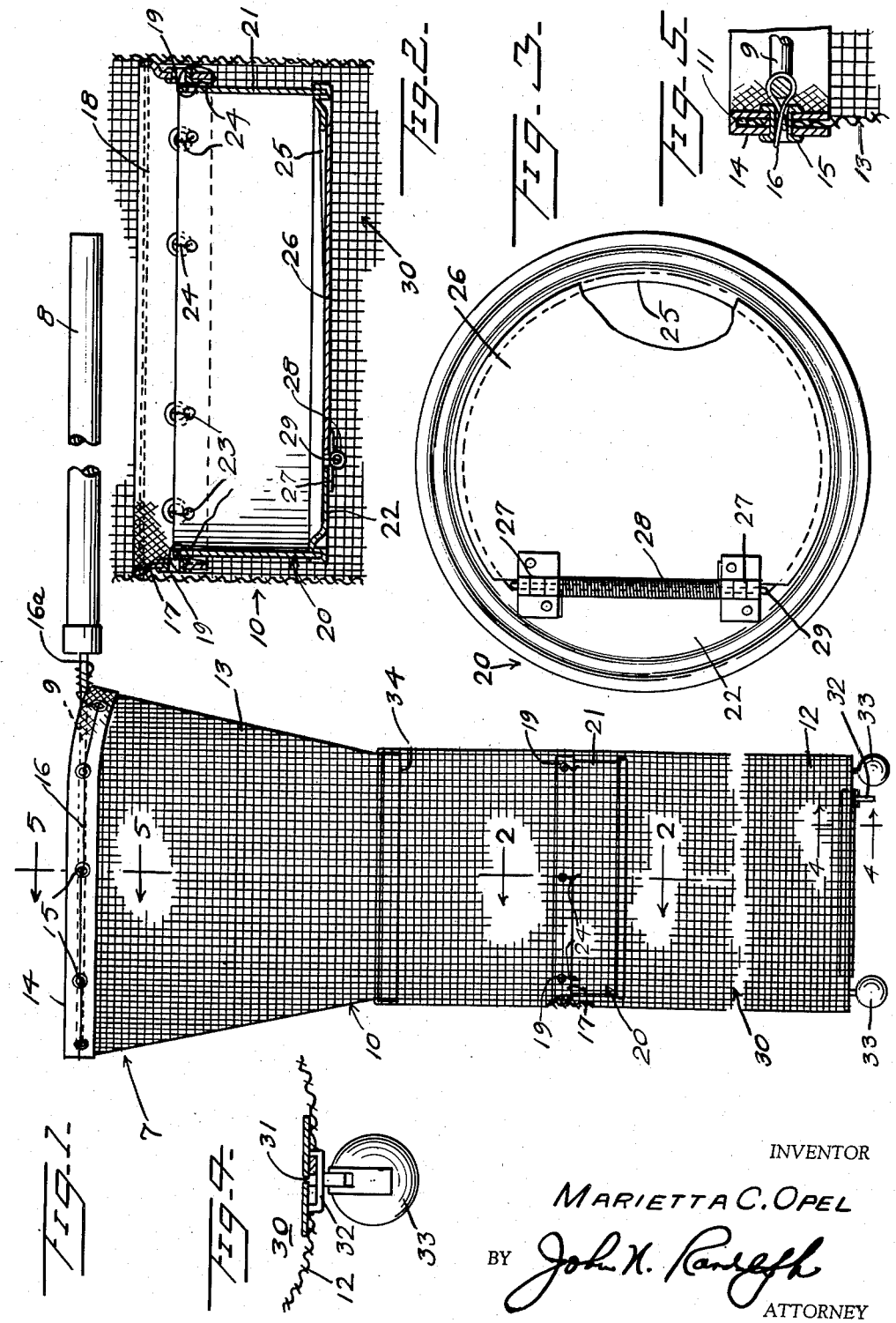

2,971,284

SHRIMP OR CRAB NET WITH ENTRAPMENT CHAMBER

Marietta C. Opel, 957 S. Kerens Ave., Elkins, W. Va.

Filed Nov. 20, 1959, Ser. No. 854,384

2 Claims. (Cl. 43—11)

This invention relates to a net for catching shrimp or crabs and including a chamber in which previously caught shrimp or crabs can be temporarily retained entrapped.

More particularly, it is an object of the present invention to provide a net which can be utilized for catching a number of shrimp or crabs without being emptied and without risking loss of the shrimp or crabs previously caught.

Various other objects and advantages of the invention will hereinafter become more fully apparent from the following description of the drawing, illustrating a presently preferred embodiment thereof, and wherein:

Figure 1 is a fragmentary side elevational view of a shrimp and crab net, constructed in accordance with the invention;

Figure 2 is an enlarged fragmentary vertical sectional view through a part of the net, taken substantially along a plane as indicated by the line 2—2 of Figure 1;

Figure 3 is a bottom plan view of a part of the net shown detached, and partly broken away;

Figure 4 is an enlarged fragmentary vertical sectional view, taken substantially along a plane as indicated by the line 4—4 of Figure 1, and Figure 5 is an enlarged fragmentary vertical sectional view, taken substantially along a plane as indicated by the line 5—5 of Figure 1.

Referring more specifically to the drawing, the crab and shrimp net in its entirety is designated generally 7 and includes an elongated handle 8 which may be of any length. The ends of a strand of heavy gauge wire are anchored in and project from one end of the handle 8 and the intermediate portion of said strand forms a hoop 9 which is preferably substantially circular.

A net body 10 has an open upper end 11 and a normally closed lower end 12. The net body 10 may be formed of any suitable mesh or net material of a proper gauge to prevent the escape therethrough of shrimp or crabs. The net body 10 may be of any desired length and is preferably provided with an upwardly flared frusto-conical upper portion 13 which terminates at its open upper end 11. A strip of binding material or tape 14 is folded lengthwise to receive the upper edge 11 of the net and combines therewith to form the open upper end of the net body. A plurality of grommets 15 extend through the folds of the tape 14 and through the upper part of the netting for securing the tape to the netting. An anchoring strand 16, which may comprise a strand of wire, extends around the outer side of the tape 14 and has portions extending inwardly through each of the grommets 15 and around a part of the hoop or rim 9 and thence back out through said grommet 15, for securing the open upper end or mouth 11, 14 around the outer side of the hoop or rim 9, as illustrated in Figures 1 and 5. The ends of the anchoring strand 16 can be anchored to the end portions of the hoop 9 adjacent the handle 8, as seen at 16a.

An endless tape or band 17 is disposed within and secured as by stitching 18 to the net body 10, and is located between the bottom 12 and the flared portion 13. As best seen in Figure 2, the stitching 18 is disposed adjacent an upper edge of the tape 17 and the unsecured bottom portion of said tape is provided with circumferentially spaced eyelets 19.

A valve frame 20 comprises a rigid annular wall 21 and a bottom 22 which is secured to the bottom edge of the wall 21. The wall 21 is open at its upper end to define the open top of the valve frame and is provided adjacent said upper end or edge with circumferentially spaced openings 23 which are spaced apart a distance corresponding to the spacing of the eyelets 19. An anchoring strand 24 extends around the tape 17 and through each of the eyelets 19 and each of the openings 23 for securing the valve frame 20 to the tape 17 and for thus anchoring said valve frame within a part of the net body 10.

The frame bottom 22 has a large opening 25 which is normally closed by a downwardly opening flap valve 26, which bears against the underside of the bottom 22, around said opening 25. The flap valve or plate 26 is connected to the bottom 22 by hinges 27 and a spring 28 is mounted on the common pintle 29 of said hinges and has one end bearing against the valve plate 26 and the other end bearing against the bottom 22 for yieldably retaining the valve plate 26 normally in a closed position, as illustrated in Figures 2 and 3. The frame 20, valve plate 26 and tape 17 form a partition in the net body 10 separating the upper part of the net body, having the open upper end, from the lower part thereof. Said lower part, disposed between the valve and the closed lower end 12, forms an entrapment chamber 30 which may be of any desired size. The bottom 12 has an elongated opening 31 which is normally closed by a conventional slide fastener 32. If the net body 10 is formed of twine or other flexible material a weight or weights 33 may be attached to the bottom 12 for holding the net body 10 extended when in use. A band or tape 34 may be secured, as by stitching, not shown, to the interior of the net body where the frusto-conical upper portion 13 thereof joins with the tubular portion of the net, particularly if said upper section 13 is separately formed.

All of the parts of the net 7 are preferably formed of materials which are resistant to corrosion or other damage due to salt water.

The crab or shrimp net 7 is utilized in a conventional manner. However, unlike conventional nets, the net 7 does not have to be emptied after each catch to avoid the risk of loss of the catch. Rather, as each catch is made the crab or shrimp passing downwardly through the net strikes the valve plate 26 to cause said plate to swing downwardly to an open position so that the catch can pass through the opening 25 into the lower entrapment compartment 30 where the catch is retained, since the slide fastener 32 is normally in a closed position. The tension of the spring 28 is such that the weight of the catch moving downwardly through the upper part of the net body and striking the plate 26 will be sufficient to swing said plate to an open position, after which the spring 28 will promptly return the plate 26 to its closed position to prevent escape of the catch from the entrapment chamber 30. When the entrapment chamber is substantially filled, the slide fastener 32 is moved to an open position so that the entrapped catch can be emptied from the entrapment chamber 30 through the opening 31 into a suitable receptacle, not shown.

It will be understood that the net body 10 may be made in various cross sectional shapes as well as various lengths, and various other modifications and changes are contemplated and may be resorted to without departing

I claim as my invention:

1. A crab and shrimp net comprising an elongated net body having an open upper end and a normally closed lower end, means supporting said net body including a supporting handle and a hoop member to which the open end of the net body is attached and by which said open end is maintained in an open position; partition means secured within the net body at a point spaced from the ends thereof and separating the net body into end chambers including a lower entrapment chamber disposed between said partition means and the normally closed lower end of the net body, said partition means including a normally closed valve plate, spring hinge means mounting said plate for downward swinging movement into the entrapment chamber and to an open position and for returning the valve plate to a closed position, said normally closed bottom having an opening for emptying the entrapment chamber, and closure means normally closing said net bottom opening.

2. A crab and shrimp net as in claim 1, said partition means including a rigid frame having an annular wall provided with an open upper end and a bottom secured to the lower end of said annular wall and provided with a large opening, said spring hinge means being attached to and supported by a part of said frame bottom, and said valve plate normally closing the opening of the frame bottom and engaging the underside of the bottom around said opening.

References Cited in the file of this patent

UNITED STATES PATENTS

| | | |
|---|---|---|
| 404,946 | Andersson | June 11, 1889 |
| 563,486 | Hibbert | July 7, 1896 |
| 563,748 | Cottrell | July 14, 1896 |
| 2,042,349 | McGhee | May 26, 1936 |